3,010,803
FLUID MIXER WITH ROTATING BAFFLES
Harry A. Wistrich, Walnut Creek, and Richard B. Olney, Oakland, Calif., assignors to Shell Oil Company, a corporation of Delaware
Filed June 21, 1956, Ser. No. 592,946
10 Claims. (Cl. 23—270.5)

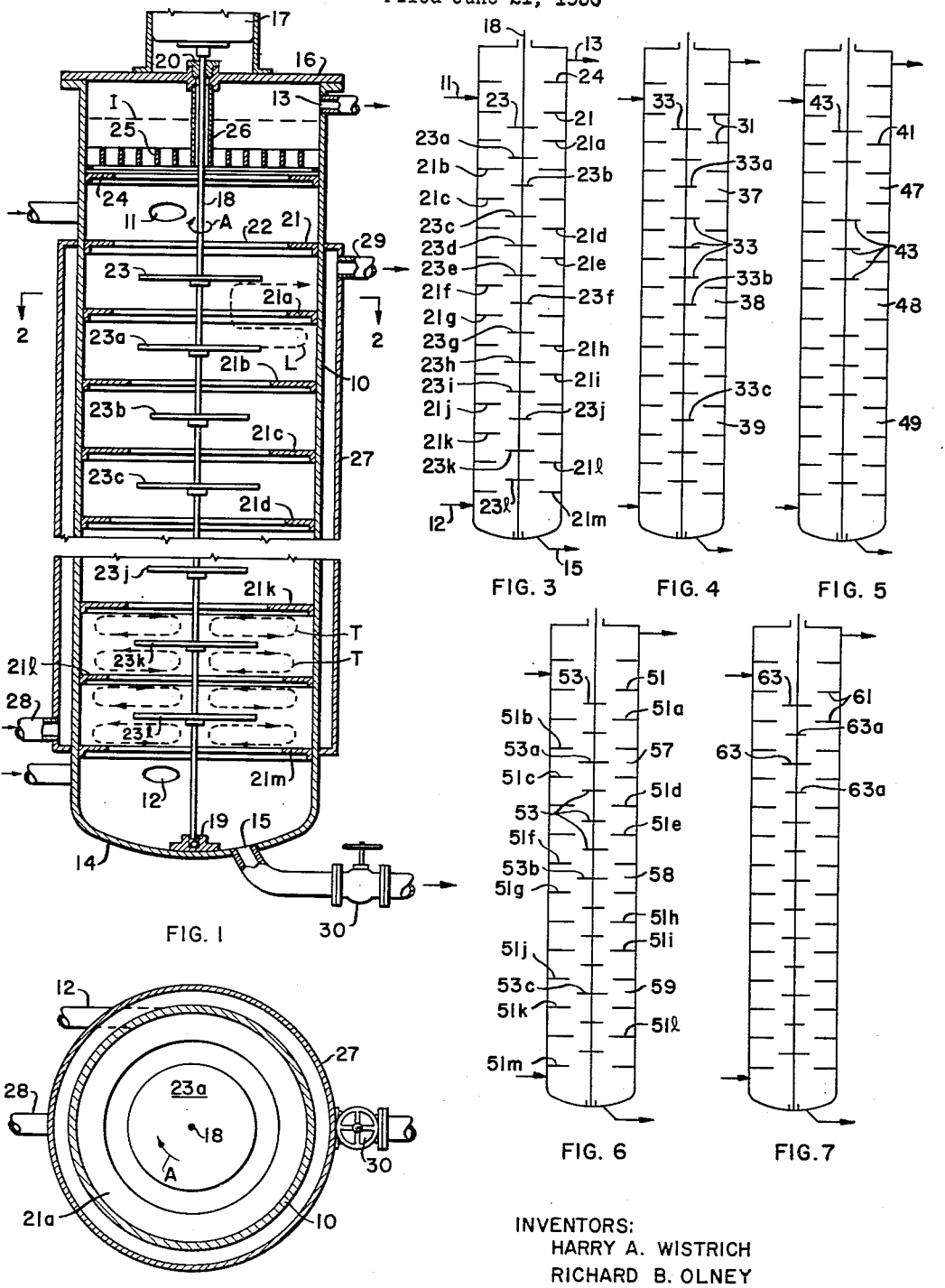

This invention relates to internally baffled, multistage fluid mixing apparatus suitable, for example, as reactors or as contacting apparatus to effect intimate contact between two or more at least partially immiscible fluid phases. When used as a reactor a single fluid phase may be passed through the several stages; the device then is a homogeneous reactor. However, several phases may be flowed through the reactor concurrently. When used as a contacting device, e.g., to effect chemical reactions or for solvent extraction, two phases are present, and usually flow countercurrently through the several stages. All applications are herein generically referred to as fluid mixing apparatus.

Mixing apparatus of this type have a series of annular stator baffles having central openings and mounted at intervals transversely within an elongated vessel, which is usually vertical, and a rotor which includes a shaft extending through the said openings and carrying fast for rotation therewith a plurality of transverse, generally flat rotor baffles distributed among the compartments defined by the stator baffles and so mounted that they are axially spaced from the adjacent stator baffles, with which they cooperate to form mixing zones. Such apparatus is sometimes known as a rotating disc contactor. The general principles of construction and operation and the vortex patterns created by the baffles when used as a contactor are disclosed in U.S. Patents Nos. 2,601,674, 2,729,544 and 2,729,545 and will not be described in detail herein.

As is more completely set forth in the cited patents, the rotor baffles produce within the several compartments vortex patterns which cause one phase to be dispersed intimately within the other, and the dispersed and continuous phases gravitate into adjoining compartments in accordance with their relative densities. Such gravitating flow is satisfactory when the operation involves reasonably balanced net rates of flow of the two phases countercurrently through the vessel. In some operations, however, the net or throughput rate of flow of one of the phases, either the dispersed or the continuous one, is insufficient to maintain a composition gradient through the series of compartments when known constructions of the apparatus are used. For example, it was found that when one phase flows only intermittently or very slowly, such as at one-tenth of the flow rate of the other, excessive axial mixing occurs. The composition of the slowly moving phase then tends to become or becomes uniform throughout the several compartments, so that the contactor is in effect operating at a very small number of stages or as a single stage; this phenomenon occurs although the same contactor can be operated at a larger number of theoretical stages with the identical ratio of phases present within the vessel but with increased flow of the above-mentioned phase. The difficulty is especially severe in fluid systems that are difficult to mix; in such cases high mixing intensities produced, e.g., by high rotor speeds, are necessary but promote equalization of the composition throughout the several compartments.

The situation of low net rate of flow of one phase, considered in the preceding paragraph, is met with whenever a fluid stream is treated with a disproportionately smaller volume of a treating fluid, e.g., when hydrocarbon oil is treated with sulfuric acid or gasoline is treated with caustic.

Axial mixing is also a problem when the device is used as a reactor wherein only one phase occurs or wherein several phases flow concurrently, since any passage of fluid counter to the main flow direction results in unequal residence times for different parts of the reaction mixture.

It is a general object of the invention to overcome the above-noted difficulty by arranging the rotor and stator baffles in such a way as to limit axial mixing. Specific objects are to limit back-mixing of the slowly moving phase and thereby to increase the number of theoretical contacting stages realized when internally baffled apparatus of the type indicated is used as a contacting apparatus and the rate of throughput of one phase is excessively low in relation to the rate of throughput of the other phase, especially when a high mixing intensity is required; and to limit back-mixing of the fluid passing through the vessel when used as a homogeneous or concurrent-flow reactor so as to effect a more uniform residence time.

In summary, according to the invention the general object is attained by using a non-uniform spacial relation between the stator baffles and the rotor along the length of the vessel, such that there occur within the vessel some mixing zones having relatively greater inter-compartment fluid intermixing rates than others. The latter zones, herein called staging zones, are usually zones of relatively lower mixing intensities and limit the inter-compartment fluid intermixing. Various specific arrangements are possible: For example, stator baffle-rotor combinations or compartments relations providing high inter-compartment intermixing rates may alternate regularly throughout the length of the vessel with others providing low intercompartment intermixing rates; or, a plurality of consecutive compartments providing similar relations (all having either high or low intermixing rates) may be grouped at two or more levels in the vessel which groups are separated from one another by single compartments or groups of compartments providing relations of the opposite type (i.e., having low or high intermixing rates, respectively).

The variables in the aforesaid relation between the rotor and the stator baffles which influence the intermixing rate include the diameter of the rotor baffle, the diameter of the opening in the stator baffle, and the proximity of the rotor baffles to the stator baffles in the axial direction. In general, for a given angular velocity decreased inter-compartment fluid intermixing are promoted by the use of smaller-diameter rotor baffles (including in the extreme case the omission of the rotor baffle within a compartment), of stator baffles with smaller openings, and by greater axial clearances between rotor baffles and stator baffles, the first and last of these expedients being accompanied by decreased mixing intensities. These expedients may be employed singly or in any desired combination; the second is preferably employed together with another, such as the first. These expedients may in some instances reduce the capacity of the apparatus as a whole by restricting the forward passage of fluids between compartments, but nonetheless improve the overall effectiveness.

The invention outlined above is founded on the principle that the tendency of a phase, such as the slowly-moving phase in a contacting operation, to become uniform throughout the series of contacting compartments is due to back-mixing, in which some of the said phase flows between compartments in the reverse axial direction, i.e., toward the end of the vessel at which it was admitted. When this axial mixing occurs at a rate that is high in relation to the net rate of flow or throughput rate of the phase in question, the composition is more or less equalized among all or several compartments. The rate of axial or back-mixing can be expressed in terms of the intercompartment fluid intermixing rate, which is defined as the ratio of the reverse flow of a given fluid phase between adjacent compartments to the net forward flow of said phase through the vessel. It is evident that the same principle applies in the case of a uniflow reactor; here reverse flow leads to a wider spread between the maximum and minimum residence times within the reactor.

It should be pointed out that the reduction of intercompartment fluid intermixing brought about by any or all of the expedients considered above cannot be applied to advantage to all of the compartments of the apparatus due to the fact that the resulting reduced mixing intensity and, in some cases, the resulting decreased capacity, are then so great as to have an adverse influence on the overall characteristics of the mixer. The instant invention purports to maintain good mixing or contacting conditions in at least certain portions of the vessel, herein called the high-intensity mixing zones, and to separate these zones from one another by others, herein called staging zones, which, although operating under somewhat less favorable mixing conditions, improve the overall operation by reducing back-mixing and thereby insuring the more uniform flow of all portions of the phase and the existence of different compositions in the several high-intensity mixing zones.

The degree of composition difference achieved by the staging zones as well as the intensity of mixing in the high-intensity zones can be selected in accordance with the requirements, as determined by the number of stages and the rate of fluid flow or capacity required and the nature of the fluids being mixed. For example, it is possible to employ a highly differentiating staging zone (using, for example, an extremely small rotor baffle or a consecutive series of small rotor baffles or even omitting the rotor in the staging zone) in combination with adjoining high-intensity zones which are operated either with very intensive mixing so as to operate each of them as a separate physical stage approaching one theoretical stage in effectiveness, or with high-intensity zones wherein mixing is only moderately more intensive than that used in the staging zones; or staging zones providing only moderate composition differences may be provided, again in combination with high-intensity zones of either type.

The invention will be described in further detail with reference to the accompanying drawing forming a part of this specification and showing certain preferred embodiments by way of example, wherein:

FIGURE 1 is a vertical sectional view of a contacting apparatus constructed in accordance with the invention;

FIGURE 2 is a transverse sectional view taken on the line 2—2 of FIGURE 1;

FIGURE 3 is a diagrammatic vertical sectional view showing the arrangement of the stator baffles and the rotor in accordance with the embodiment of FIGURES 1 and 2; and FIGURES 4, 5, 6 and 7 are diagrammatic vertical sectional views showing three alternative arrangements of the stator baffles and the rotor.

Referring to FIGURES 1, 2 and 3, the vessel includes a vertical cylindrical wall 10, circular in cross section, having upper and lower inlet pipes 11 and 12, respectively, which may optionally be tangential, as shown, an upper discharge pipe 13 and, in the bottom wall 14, a lower discharge pipe 15. The vessel is closed by a top plate 16 carrying an electric motor 17 which is coupled to a central, vertical shaft 18. This shaft is rotatably mounted in bearings 19 and 20. A plurality of horizontal, flat, annular stator baffles 21 to 21m is mounted immovably within the vessel at suitable intervals, which are equal in this instance. These baffles are imperforate except for central circular openings 22, which are large in relation to the cross section of the shaft. The stator baffles divide the vessel into a vertical series of compartments which communicate consecutively through said openings. The shaft 18 carries a plurality of rotor baffles 23 to 23l in the form of flat, circular, imperforate discs, and the shaft and rotor baffles collectively constitute the rotor. Each rotor baffle is fixed to the shaft for rotation therewith and is situated within a compartment in axially spaced relation to the adjoining stator baffles, e.g., at the mid-level of the compartment. A stator baffle 24 and a current-suppressing element such as an egg-crate structure 25 may be optionally mounted above the inlet 11. Further, a tube 26 may surround the upper part of the shaft 18. The vessel may have a jacket 27 fitted with pipes 28 and 29 for the circulation of a heating or cooling fluid.

Considering now the improvement according to this embodiment of the invention, it will be noted that the diameters of the openings in the stator baffles and of the rotor baffles are not uniform; thus, the stator baffles 21 and 21a-d-e-h-i-l-m have large openings and the other stator baffles 21b-c-f-g-j-k have smaller openings. The rotor baffles 23b-f-j, which lie between adjoining pairs of stator baffles with small openings, have smaller diameters than the other rotor baffles 23 and 23a-c-d-e-g-h-i-k-l. The consequence of this arrangement is that the rotor baffle 23b is related to the adjacent stator baffles 21b and 21c in a manner to cause lower mixing intensities and lower inter-compartment fluid intermixing rates than those caused by stator baffle-rotor combinations on either side thereof, such as between the rotor baffle 23 and stator baffle 21a and between rotor baffle 23c and stator baffle 21d. Similarly, the rotor baffles 23f and 23j are related to their adjacent stator baffles to produce lower inter-compartment fluid intermixing rates.

In the preferred arrangement illustrated the largest rotor baffles can pass through the stator baffles having the smallest openings therein, so that the rotor shaft and its baffles can be lifted through the series of stator baffles. This arrangement is not however, in every case essential to the present invention.

The operation as a contactor is as follows: It is assumed that the heavier fluid is to form a continuous phase and that the lighter fluid is to be dispersed therein. The column is filled through inlet 11 with the heavier fluid, the shaft 18 is rotated by the motor 17 in a direction indicated by the arrow A (this direction being preferably the same as the tangential direction of the inlet pipes 11 and 12) and the lighter fluid is admitted continuously or intermittently through the inlet 12, the admission of heavier fluid at 11 being continued. Toroidal vortices T are thereby set up within each compartment, resulting in the dispersion of the lighter fluid in the heavier. The greater part of the dispersion is recirculated within the vortices and the balance gravitates from stage to stage. Thus, the net path for a particle of lighter fluid between compartments is as indicated by the dashed line L. These flow patterns are further described in the above-cited patents. The relatively quieter space between the lowermost baffle 21m contains only the heavier fluid, commingled above the inlet 12 with large bubbles or globules of the lighter fluid. The heavier fluid is discharged through the outlet 15 at a rate controlled by the valve 30. The dispersion rising past the upper inlet 11 has the rotational movement thereof checked by the structure 25; this permits the dispersed droplets to settle upward in a quiescent settling space above in which it collects above the interface I. The lighter fluid is withdrawn through the outlet 13 and the heavier fluid settles back through the structure 25, so that there is no net vertical flow thereof at this level.

As was noted earlier, when one of the fluid phases flows slowly or intermittently, back-mixing, i.e., axial mixing thereof in the reverse direction, would tend to equalize among the several compartments the composition of that phase if all stator baffle-rotor relations were the same throughout the vessel for rotor speeds sufficient good for mixing. This tendency is effectively counteracted by the instant construction in that the smaller-diameter rotor baffles 23b-f-j are so related to their adjacent higher and lower stator baffles as to cause less intensive mixing; also, the smaller openings in the said adjacent stator baffles tend to reduce back-mixing, and this expedient supplements the effect of the smaller rotor baffles. The entire compartments containing these smaller rotors (including the mixing zones immediately above and below these rotors) therefore constitute staging zones, which divide the vessel into four high-intensity mixing zones which operate at favorable contacting conditions and among which materially different compositions of both the slowly-moving phase and the more rapidly-moving phase prevail. Thus, the two compartments above the stator baffle 21b from one such high-intensity mixing zone and those between baffles 21c and 21f form another, etc. It may be noted that either the ascending, dispersed phase or the descending, continuous phase may be that which flows through the vessel at the lesser rate.

While the foregoing description pertained to the dispersal of the lighter fluid, it is evident that the invention is equally applicable to the case where the heavier fluid is dispersed, as is disclosed in the aforementioned patents. In this case the baffle 24 and structure 25 are mounted at the bottom, below the inlet 12, and the interface I is situated below the said structure. Dispersion of the heavier fluid is effected by admitting it only after the vessel has been filled with the lighter fluid.

It may be further noted that the invention may be applied to contactors of various forms, including particularly those with streamlining bodies or flat guide rings, in accordance with the above U.S. Patents Nos. 2,729,544 and 2,729,545, respectively.

The additional views of the drawing illustrate diagrammatically certain specific modified arrangements whereby the relations between the stator baffles and the rotor can be varied.

In the arrangement according to FIGURE 4, the baffling arrangement differs from that previously described only in that all of the stator baffles 31 are of the same construction. The three rotor baffles 33a-b-c have smaller diameters than the other rotor baffles 33 and the compartments 37, 38 and 39, wherein the former are situated, form staging zones; the other compartments form high-intensity mixing zones. Thus, the upper two compartments form one high-intensity mixing zone and the group of three consecutive compartments beneath that containing the rotor 33a form another etc. This arrangement, as well as that of FIGURES 1–3, is suitable particularly at relatively low rotor speeds, wherein effective mixing is provided despite a somewhat lower mixing intensity by arranging several high-intensity compartments consecutively, and only a moderate differentation of composition between these zones is necessary, e.g., when back-mixing is only moderately severe. The arrangement of FIGURE 4 permits somewhat greater throughput and would permit slightly greater back-mixing than that of FIGURES 1–3.

FIGURE 5 shows a construction wherein the rotor baffles are omitted in the compartments which serve as staging zones; the stator baffles 41 are of identical construction throughout the vessel, but they may be arranged as was described for FIGURES 1–3. All compartments which contain rotor baffles 43—which may be all of the same diameter—are high-intensity mixing compartments, wherein the rotor baffles are related to the stator baffles to effect effective mixing. In the other compartments, indicated by the numbers 47, 48 and 49, the only part of the rotor occurring is the shaft, and it is related to the stator baffles to cause very low-intensity mixing, whereby these form staging zones. Some mixing does, however, occur inasmuch as the dispersion moves with high rotational velocity, which is for the most part transmitted through the fluid from the adjoining compartments which have rotor baffles and in small part induced by the shaft. Since the staging zones provide open flow spaces for the continuous, unobstructed passage of the fluid dispersion therethrough—being free from coalescing means or packing, which would obstruct such flow of a dispersion—no stratification of the phases occurs therein. These staging zones achieve a high degree of composition differentiation and may be regarded as the ultimate in making the rotor baffles smaller.

FIGURE 6 shows a contactor arranged to provide three high-intensity mixing compartments 57, 58 and 59, which contain large-diameter rotors 53a, 53b and 53c, respectively; the other compartments contain rotor baffles 53 having smaller diameters and hence lower mixing intensities prevail therein, so that they function as staging zones. The stator baffles which lie between small-diameter rotor baffles, viz., 51a-d-e-h-i-l have small-diameter openings, while the other stator baffles 51 and 51b-c-f-g-j-k-m have central openings of larger diameters. Inclusion of the terminal stator baffles in the latter group permits increased capacity without flooding. This arrangement is suitable when high rotor speeds, conducive to high inter-compartment fluid inter-mixing rates, are used.

FIGURE 7 shows a variant wherein all stator baffles 61 are alike and two sizes of rotor baffles are used in alternation. Large-diameter rotor baffles 63 alternate with small-diameter baffles 63a. In this arrangement each compartment which contains a large rotor baffle 63 functions as a high-intensity mixing zone and the alternate compartments, containing the baffles 63a, function as staging zones. Such an arrangement may be most suitable, for example, for fluid systems requiring only moderately high rotor speeds for good dispersion.

The same considerations apply when the device is used as a reactor. Thus, when used as a homogeneous reactor only one set of flow connections, 12 and 13 or 11 and 15, is needed, and the rotor is used for the purpose of mixing the reacting stream to establish within each compartment uniformity in composition and temperature, the latter being controlled by the temperature of fluid circulated within the jacket 27.

We claim as our invention:

1. A fluid mixing apparatus comprising: an axially elongated vessel one end of which is higher than the other; a plurality of transverse, axially spaced, annular stator baffles fixed within said vessel, having opposed faces and central openings, and defining a series of compartments which are in consecutive communication through said openings; means for admitting fluid to the vessel at one end of the series and for discharging the fluid at the other end of the series; and a rotor including a rotatably mounted shaft extending through said openings with ample radial clearances with respect to the stator baffles for the free passage of fluid through the openings and carrying fast for rotation therewith a plurality of rotor baffles distributed among a plurality of said compartments and situated in axially spaced relation to the stator baffles, the spatial relations of the stator baffles to the respectively adjacent rotor baffles being recurrently varying along the length of the shaft so as to produce a series of mixing zones of alternating inter-compartment fluid intermixing rates for limiting back-mixing.

2. A fluid mixing apparatus according to claim 1 wherein an intermediate rotor baffle has a diameter which is less than the diameters of at least some rotor baffles situated distributively on opposite sides of said intermediate rotor baffle.

3. A fluid mixing apparatus according to claim 2 wherein a stator baffle adjoining said intermediate rotor baffle has an opening the diameter of which is less than the diameters of the openings in at least some stator baffles situated distributively on opposite sides of said intermediate stator baffle.

4. A fluid mixing apparatus according to claim 1 wherein an intermediate stator baffle has an opening the diameter of which is less than the diameters of openings in at least some stator baffles situated distributively on opposite sides of said intermediate stator baffle.

5. A fluid mixing apparatus according to claim 1 wherein an intermediate rotor baffle has a diameter which is greater than the diameters of at least some rotor baffles situated distributively on opposite sides of said intermediate rotor baffle.

6. A fluid mixing apparatus according to claim 5 wherein a stator baffle adjoining said intermediate rotor baffle has an opening the diameter of which exceeds the diameters of openings in at least some stator baffles situated distributively on opposite sides of said intermediate stator baffle.

7. A fluid mixing apparatus according to claim 1 wherein an intermediate stator baffle has an opening the diameter of which exceeds the diameters of openings in at least some stator baffles situated distributively on opposite sides of said intermediate stator baffle.

8. A fluid mixing apparatus according to claim 1 wherein said rotor baffles and stator baffles are predominantly flat and imperforate save for said central openings in the stator baffles.

9. A fluid contacting apparatus comprising: a vertically elongated vessel shaped internally as a surface of revolution about a vertical axis; a plurality of horizontal, essentially flat, annular stator baffles fixed within said vessel and extending at vertical intervals from the said interior surface radially to central, circular openings, said baffles defining a series of compartments which are in consecutive communication through said openings; means for admitting fluids to be contacted at vertically spaced points in said vessel for countercurrent flow through said compartments and for discharging the fluids after such countercurrent flow; a shaft extending through said openings with ample radial clearances with respect to the stator baffles for the free passage of fluid through the openings; means mounting said shaft for rotation about said vertical axis; a horizontal, substantially flat, circular rotor baffle for each of said compartments mounted on said shaft for rotation therewith at locations spaced by substantial vertical distances from the adjoining higher and lower stator baffles, said rotor baffles including a group thereof having relatively larger diameters interspersed with rotor baffles of relatively smaller diameters.

10. A fluid contacting apparatus according to claim 5 wherein the diameters of the central opening in each stator baffle is greater than the diameters of the rotor baffles toward one end of the vessel.

References Cited in the file of this patent

UNITED STATES PATENTS 2,601,674    Reman _____ June 24, 1952